United States Patent [19]

Angst et al.

[11] Patent Number: 4,761,085
[45] Date of Patent: Aug. 2, 1988

[54] PRINTER WITH ENHANCED BIDIRECTIONAL LOGIC SEEKING FOR INCREASED THROUGH-PUT

[75] Inventors: Tim V. Angst; Demetrios Troupes, both of Charlotte, N.C.

[73] Assignee: International Business Machines Corporation, Armonk, N.Y.

[21] Appl. No.: 33,449

[22] Filed: Apr. 1, 1987

[51] Int. Cl.$^4$ .............................................. B41J 19/30
[52] U.S. Cl. .................................... 400/323; 400/121; 400/322
[58] Field of Search ............... 400/121, 124, 320, 322, 400/323, 328; 101/93.04, 93.05; 364/518, 519

[56] References Cited

U.S. PATENT DOCUMENTS

| | | | |
|---|---|---|---|
| 3,708,050 | 1/1973 | McCarthy | 400/124 |
| 3,764,994 | 10/1973 | Brooks | 400/124 X |
| 3,950,685 | 4/1976 | Kramer | 400/124 X |
| 3,970,183 | 7/1976 | Robinson | 400/124 |
| 4,376,588 | 3/1983 | Moeller | 400/322 |
| 4,463,444 | 7/1984 | Daniels | 364/900 |
| 4,469,460 | 9/1984 | Hughes | 400/124 X |

FOREIGN PATENT DOCUMENTS 57-142382  9/1982  Japan .................... 400/322

OTHER PUBLICATIONS

Technical Disclosure Bulletin vol. 29, No. 6, pp. 2652–2658, Nov. 1986.

Primary Examiner—Paul T. Sewell
Attorney, Agent, or Firm—Robert M. Chiaviello, Jr.

[57] ABSTRACT

Through-put of a printer is increased by optimizing the print head's movement between print lines. Optimization is performed on a time basis rather than a distance basis. A determination is made as to whether it is quicker to position the print head at the left or right end position of the next print line. The calculations account for current print head position, the relative end positions of the next print line, the length of the next print line, current print head speed, the various acceleration and deceleration times and the turn-around settling time for the print head.

12 Claims, 9 Drawing Sheets

PRINTER WITH ENHANCED BIDIRECTIONAL LOGIC SEEKING FOR INCREASED THROUGH-PUT

TECHNICAL FIELD

This invention relates to bidirectional serial printers and particularly to the controls for such printers.

BACKGROUND ART

Serial printers are printers of the type having a number of printing elements less than is necessary for printing across an entire line. In the operation of a serial printer, the print element moves over a certain distance along a line and is actuated to effect printing at a plurality of locations during its travel. There are two types of serial printers; fully formed character printers and matrix printers. Fully formed character printers print the entire character in one print operation; an example would be the popular daisy wheel printers. Serial matrix printers, in general, print by composing a character by means of the actuation of a plurality of wires, ink jets, heating elements or other actuating means that print less than an entire character so that the characters are composed of elements such as dots. This invention is useful with either fully formed character or matrix printers.

Originally serial printers printed from a left position or starting point and sequentially printed until the line was complete. At the completion of the print line, the paper was indexed and the print element was returned to the starting point before printing the next print line. To increase through-put, it is known to print bidirectionally; that is, the next print line is printed backwards instead of returning the print element to the starting position. U.S. Pat. No. 3,708,050 to McCarthy for Printer Control With Monodirectional and Bidirectional Printing Compatibility describes a printer that can accept a data stream formatted for a monodirectional printer yet print the data bidirectionally. U.S. Pat. No. 4,463,444 to Daniels et al. for Word Processing System Having A Formatting Bidirectional Printer is a further enhancement.

In order to further increase through-put of bidirectional printers, it is known to position the print element based on stored information relative to the right and left margins of the next print line. At the completion of a print line, a comparison of the current print line end position is made with the right and left end positions of the next print line to determine the closest end position. On the basis of that distance comparison, the print element is directed to proceed to the closest end position of the next print line. This technique also known as bidirectional logic seeking, is fully explained in U.S. Pat. No. 3,764,994 to Brooks et al. for Serial Printer With Bi-Directional Drive Control.

A further improvement to the bidirectional logic seeking printers is described in U.S. Pat. No. 4,376,588 to Moeller for Bi-Directional Serial Printer With Look-Ahead. The conventional bidirectional logic seeking printer described by Brooks et al., is modified to determine the distance between the end position of the current print line and the beginning print position of the next print line in the direction of print element travel. If the determination indicates that the distance is less than a specified maximum distance, the print element is continued in the same direction past the end print position of the current line to the beginning position of the next line. This determination must be made prior to the print element reaching the end position of the current print line. Looking ahead to the next print position, prior to stopping the print element, and continuing the print element in the current direction if that distance is small, increases over all printer through-put.

In U.S. Pat. No. 4,469,460 to Hughes et al. for Matrix Printer With Optimum Printing Velocity a technique is described for further enhancing printer through-put by selecting the print element velocity as a function of print line length, so that for short line lengths, a low velocity is selected. By selecting a low velocity, less time is spent accelerating and decelerating the print element. For short enough line lengths the time lost printing at a lower velocity is compensated by the time gained in not having to accelerate to a high velocity and decelerate therefrom; thus, printer through-put is enhanced. For longer print lines, it is worth accelerating the print element to the maximum constant speed.

A disadvantage of the foregoing techniques has been the inability of printers to print at the theoretical limit set by the repetition rate of the print element. In an impact printer for example, the repetition rate is determined by the minimum time between print actuator firings. Some of the factors limiting the printer through-put are (1) the time required to index the record medium, (2) the turn-around settling time, (3) the time to accelerate to constant velocity and (4) the time to decelerate from constant velocity.

One approach to overcoming these disadvantages is described in an article entitled Print Head Speed And Stopping Distance Specification For Voltage-Drive Motor Control Systems disclosed in IBM Technical Disclosure Bulletin, Vol. 29, No. 6, November 1986, page 2652. The technique described permits printing on the acceleration and deceleration ramps, however, accurate position sensors and complicated feed back systems are required.

SUMMARY OF THE INVENTION

This invention entirely changes the approach to bidirectional printing by focusing not on the distances to be travelled, but on the time required to traverse between print positions, taking into account those factors that limit through-put such as time required to stop, turn around and travel in an opposite direction versus the time required to continue in the same direction.

A printer incorporating the invention comprises a drive means for controlling the movement of a print element, such as a wire matrix print head, for producing characters on a record medium such as paper. The print element is bidirectionally moveable across the record medium and places the characters on the record medium in a plurality of print lines. The drive means controls the print element so as to minimize the time required to move the print element between the end positions of successive print lines.

More particularly, a printer capable of bidirectional printing, using a moving print element, comprises a means for moving the print element, a means for analyzing the current and next print lines to select the path requiring the shortest amount of travel time, and means responsive to the analyzing means for directing the moving means to move the print element along the selected path.

According to the present invention, a method for controlling a printer comprises the following steps. First, printing a first character line with a printing element moving in one direction to an end position. Second, determining the first and second end positions of the next print line while the print element is still moving at constant speed. Third, computing a first time for printing the next line along a first path beginning at the first end position and a second time for printing the next line along a second path beginning at the second end position. Fourth, selecting either the first path or the second path corresponding to shorter of either the first time or the second time. And finally, printing the next line along the selected path.

BRIEF DESCRIPTION OF THE DRAWINGS

Referring now to the drawings, wherein like reference numerals are used to designate like parts, a preferred embodiment of the invention is described.

DETAILED DESCRIPTION OF THE PREFERRED EMBODIMENT

The details of constructing a printer that would incorporate this invention are well known to those skilled in the art. An example of prior art printers that could usefully adopt this invention are the IBM Model 4201 and Model 4202 Proprinter. In the preferred embodiment, this invention includes a program controlled microprocessor such as an Intel 8031, for directing the operation of the electronic and electromechanical devices associated with a printer.

Figure 1:
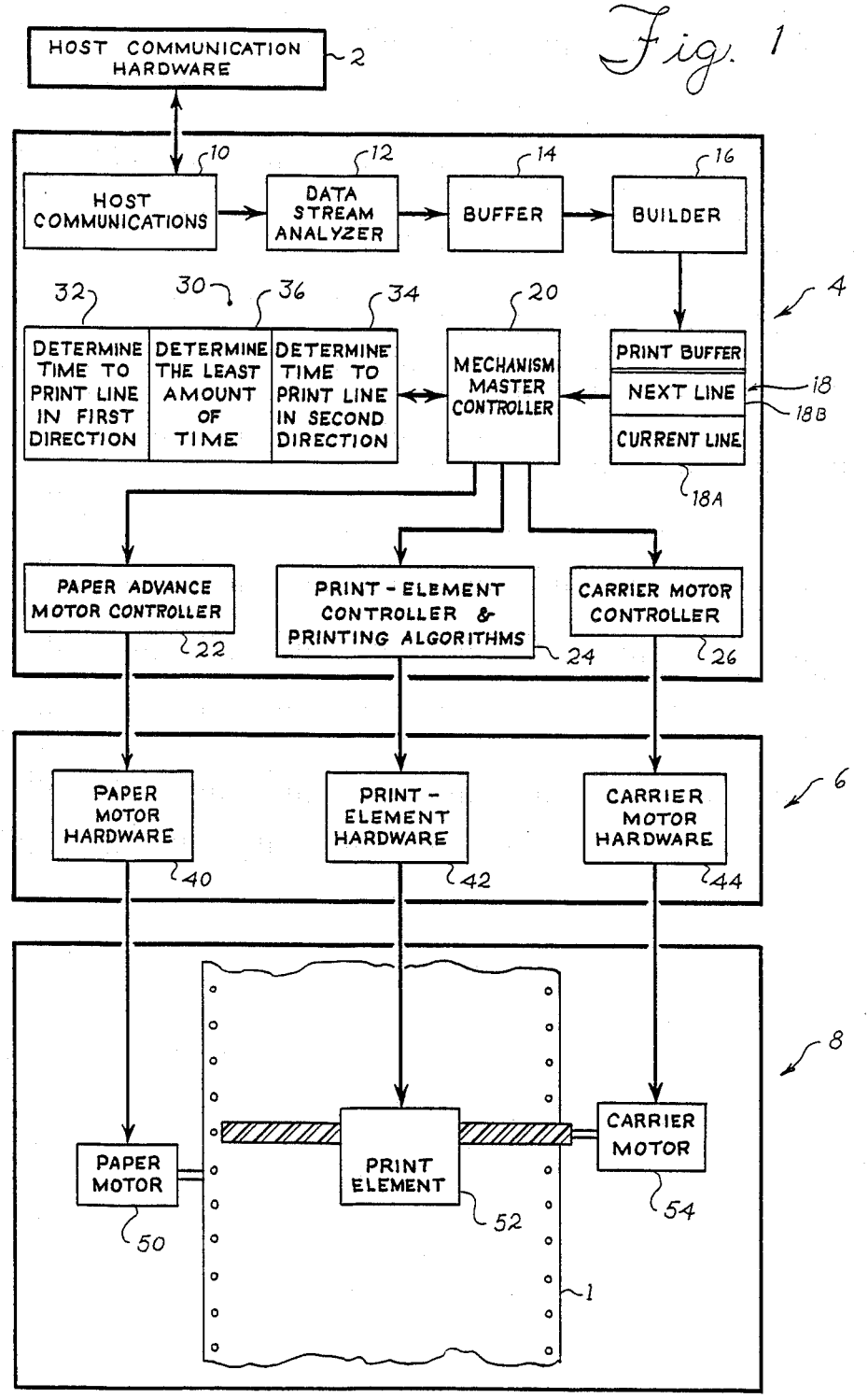
FIG. 1 is a diagrammatic representation of the logic and apparatus for practicing the present invention.
Figure 2:
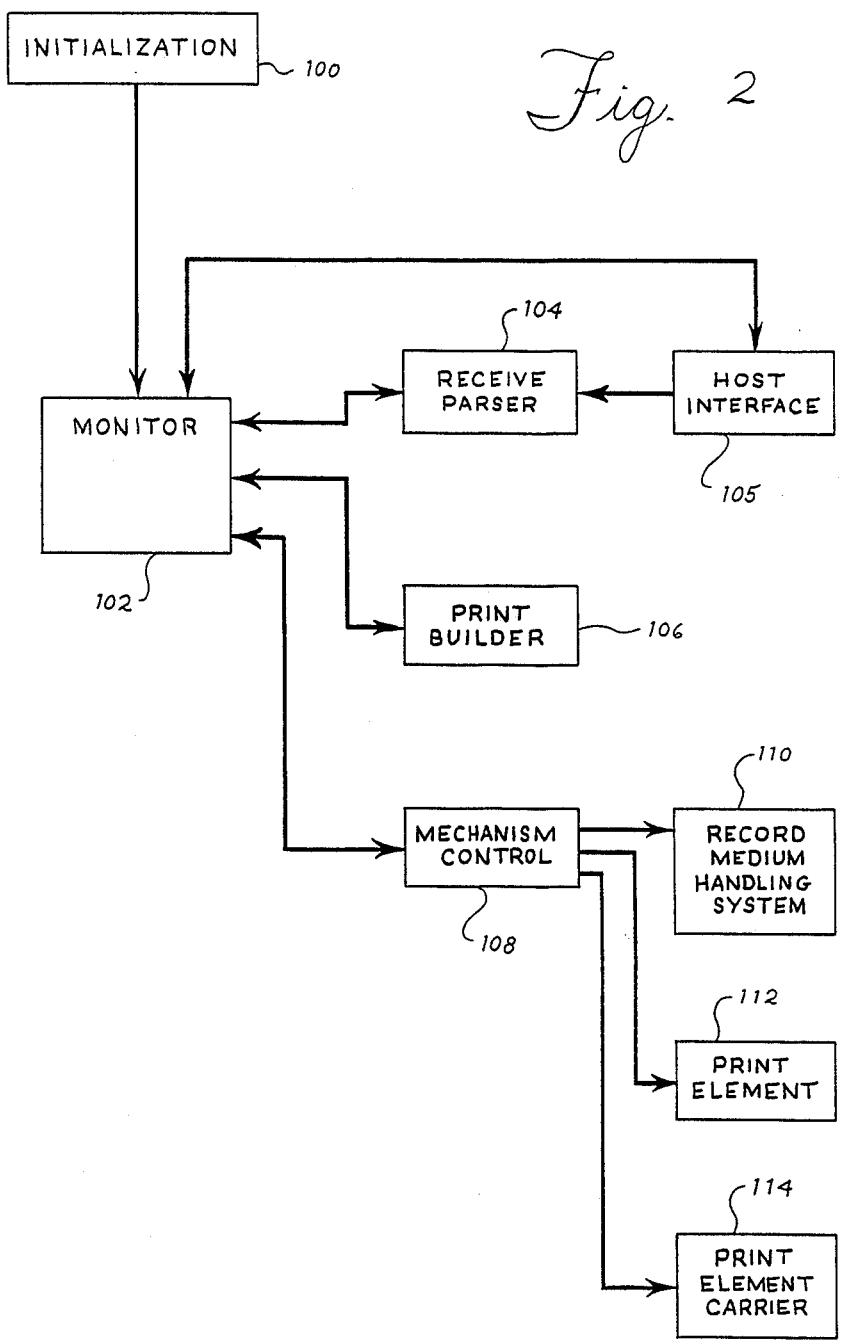
FIG. 2 is a block diagram of the logic structure for a printer using the present invention.

Referring to FIGS. 1 and 2, a diagramatic representation of the logic and apparatus for practicing the invention is described. A host computer (not shown), such as an IBM Personal Computer, communicates with a microprocessor controlled printer via host communication hardware 2 by transmitting to the printer a data stream comprised of print characters and printer control codes. Host communication hardware 2 can be a serial or parallel printer port which are well known to those skilled in the art. The data stream is processed by microprocessor 4 to generate the appropriate control signals for directing the operation of electronic mechanism controller 6. Based on the signals received from microprocessor 4, controller 6 drives the various elements of mechanism 8 which results in printing characters on record medium 1.

Referring now to FIG. 2, a block diagram of the program logic structure for controlling microprocessor 4 is described. When power is first applied to the printer, initialization routine 100 is implemented for testing the various components of the printer and resetting the various control parameters. When initialization is complete, monitor 102 is activated to perform master control functions such as supervising the various program functions in the system by calling the different routines in sequential order and passing temporary control to the selected module.

Receive parser 104 determines whether data is available at host interface 105. If data is available, receive parser 104 reads, processes and stores the data in buffer 14 (FIG. 1). Receive parser 104 continues reading, processing and storing data as long as data is available at interface 105 or until buffer 14 is full. Upon the occurrence of either event, control is returned to monitor 102 which in turn passes control to print builder 106.

The data in buffer 14 is taken by print builder 106 for further processing. Print builder 106 is responsible for passing correctly formatted and terminated print buffers to mechanism control 108. Print builder 106 returns control to monitor 102 when all data in buffer 14 is formatted, or the print buffer is unavailable or when a print buffer is complete and ready for printing. When the print buffer is ready for printing, monitor 102 passes control to mechanism control 108.

All aspects of producing printed characters on record medium 1 are handled by mechanism control 108, including control of the record medium handling system 110, print element 112 and print element carrier 114. When printing is initiated, mechanism control 108 returns control to monitor 102.

Referring again to FIG. 1, host communications module 10 of microprocessor 4 supervises the reception of data from the host via host interface 105 (FIG. 2). Communications module 10, which is a functional component of receive parser 104 (FIG. 2) performs any error checking that is deemed necessary, transmits the appropriate acknowledgements or error codes to host communication hardware 2 and passes the received data to data stream analyzer 12, also a component of receive passer 104 (FIG. 2). The printer control codes and the character data are parsed by data stream analyzer 12 and parsed to buffer 14. The control codes and character data of buffer 14 are used by builder 16 equivalent to print builder 106 (FIG. 2), to fill print buffer 18 with properly formatted information representing the print lines of characters to be printed on record medium 1. Print buffer 18 is partitioned into two parts, current line buffer 18A stores the data representing characters and control codes for producing a first print line; next line buffer 18B stores the data representing characters and control codes for producing the next print line. With this structure, the system uses the FIFO (first-in first-out) method for data handling.

Based on the data stored in print buffer 18, mechanism master controller 20 activates modules 22, 24 or 26 to produce appropriate signals for directing the operation of electronic mechanism controller 6. To increase the over all printing through-put, mechanism master controller 20 calls on module 30 to set up the activation sequence for carrier motor controller 26. Module 30 performs the enhanced bidirectional logic seeking that achieves the substantial increase in through-put.

Module 30 consists of three sub-modules that, based on the current print line end position, the current direction of the print element and the two end positions for the next print line determines the fastest route for the print element, directed by carrier motor controller 26, to follow. Sub-module 32 determines the time necessary to begin printing the next line if print element 52 continues in the current direction.

Sub-module 34 determines the time required to begin printing the next line if the print element reverses direction. And sub-module 36 selects the quickest path based on the least amount of time. Mechanism master controller 20 instructs carrier motor controller 26 to follow the quickest path selected by sub-module 36.

Carrier motor hardware 46 of electronic mechanism controller 6 translates the signals of carrier motor controller 26 to the appropriate number of pulses for driving carrier motor 54, which in the preferred embodiment is a stepper motor, in the proper direction for positioning print element 52.

Figure 9:
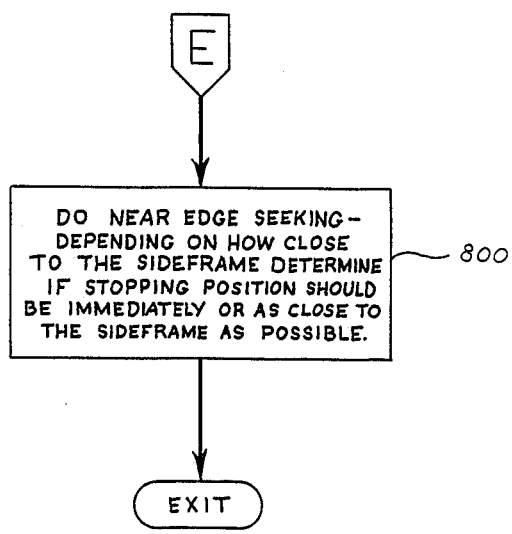
Figure 10:
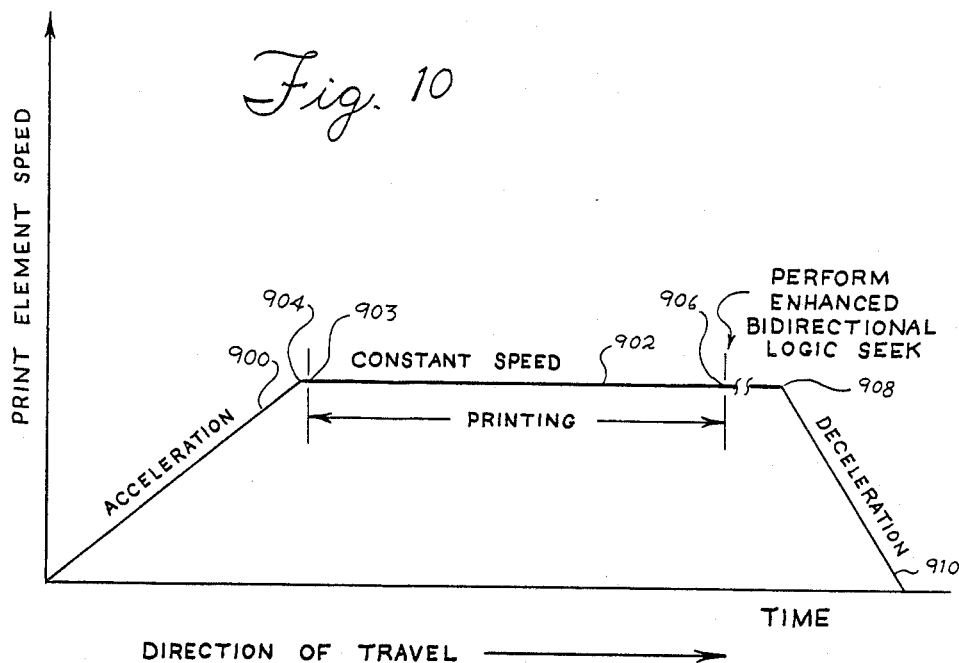
FIG. 10 is a timing chart illustrating the change in velocity with time during the printing of a typical print line.

Referring now to FIG. 10, a timing chart illustrating the change in velocity with respect to time during the printing of a typical print line will be described in preparation for an explanation of the method described in the flow charts of FIGS. 3 through 9. From a rest position, the print element must accelerate to a constant print speed before printing can begin. To accommodate the necessary acceleration, the print element must be positioned ahead of the first actual print position by a distance corresponding to acceleration ramp 900.

In the preferred embodiment, printing occurs only while the print element is moving at a constant velocity, depicted as 902. Actual printing beginning at 903, is somewhat delayed after the print element reaches constant velocity to allow for settling time, this is shown as 904.

When printing is completed, position 906, and while the print element continues to move a constant velocity, a determination is made for positioning the print element at one end or the other of the next line according to the present invention. If the enhanced bidirectional logic seeking, module 30 of FIG. 1, determines that the print element must change direction, an immediate stop is performed at position 908. Time must be allowed for the print element velocity to reach zero, deceleration ramp 910.

The basic concept of this invention recognizes that acceleration ramp 900, and deceleration ramp 910 affect printer through-put and that by taking these factors into account, through-put is enhanced. Furthermore, it is recognized that in those instances where the print element must decelerate, stop, turn around and accelerate there is an additional settling time that must be taken into account. In this invention that settling time is included as a portion of the compensation factor of block 44, FIG. 5 and block 600, FIG. 7.

In the preferred embodiment, time is measured by counting time-steps of carrier motor 54 corresponding to units of time. This can best be visualized by the sweep second hand of an analogue clock. As the second hand traverses stepped distances, time is measured. In this invention, time-steps are counted to measure the time for the print element to reach different positions.

Figure 3:
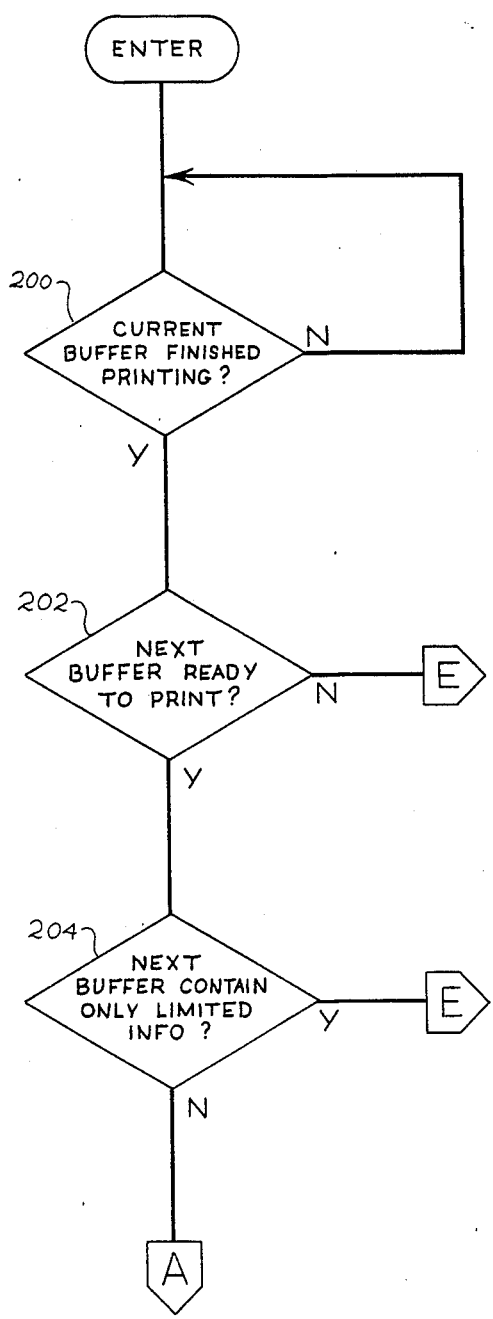
FIGS. 3 through 9 are flow charts describing a preferred embodiment of the invention.

The flow charts for describing the sequence of program steps followed by microprocessor 4 (FIG. 1) in implementing the enhanced bidirectional logic seeking of module 30 are depicted in FIGS. 3 through 9. Referring now to FIG. 3, decision block 200 determines whether the current line is finished printing. When the current line is completed, decision block 202 determines whether the next buffer is ready. If the next buffer is not ready, the routine exits to point E, FIG. 9; otherwise, the routine continues. In the next step, decision block 204, the next buffer is tested to determine whether it contains only line feed information. When the next buffer has only line feed information, the program exits to point E if the next buffer contains more than line feed information the routine continues.

Figure 4:
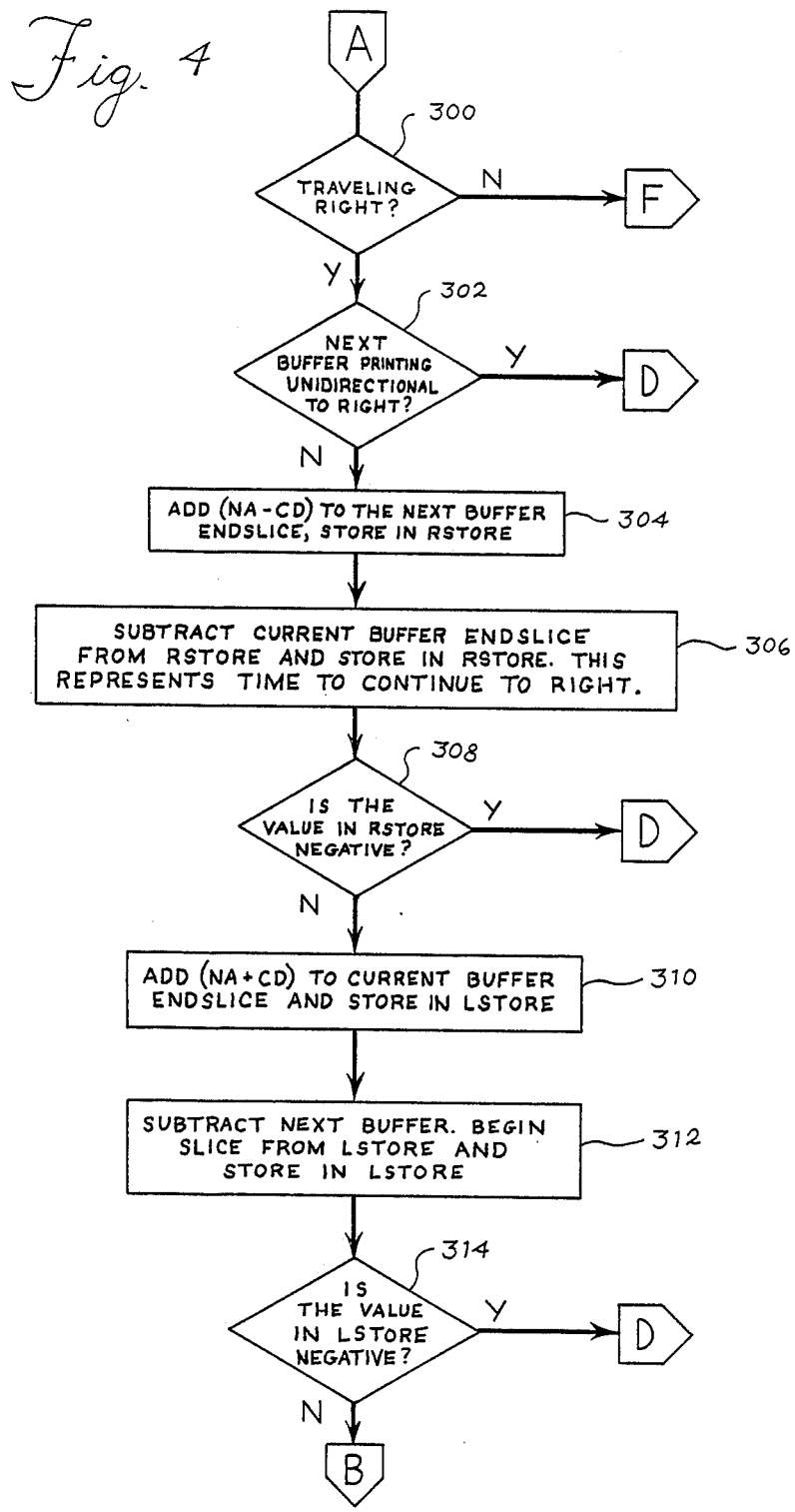

Referring now to FIG. 4, at decision block 300, which determines the direction of travel of print element 52, the program branches. If the element is traveling right, decision block 302 determines whether the next print line requires printing in the rightward direction only; otherwise, the program follows a separate branch beginning at point F of FIG. 6.

Still referring to FIG. 4, if the next print line does not require only right printing, the routine begins to determine how much time is required for the print element 52 to reach the left end and the right end of the next print line.

In block 304, the number of steps to decelerate from the current speed, CD, is subtracted from the number of steps to accelerate to constant speed for the next line, NA. This value, NA-CD, corresponds to a number of time-steps. This value is added to the right end position of the next line, also expressed in steps, and stored in RSTORE, block 306. In block 306, the end position of the current line is subtracted from the value in RSTORE. This represents the number of time-steps required to reach the right start position for the next print line. If this value is negative, meaning that the next is entirely to the left of the current end position, the print element stops immediately, by exiting to point D, FIG. 8; this determination is made in decision block 308.

In blocks 310 and 312, calculations analogous to the calculations of blocks 304 and 306 will be performed for the left end position of the next line. Decision block 314 determines whether the next print line is entirely to the right of the current end position. If the next line is entirely to the right of the current end position, the routine exit to point D to stop the print element immediately; otherwise the program continues to determine which of two paths will result in the shortest amount of travel time.

Figure 5:
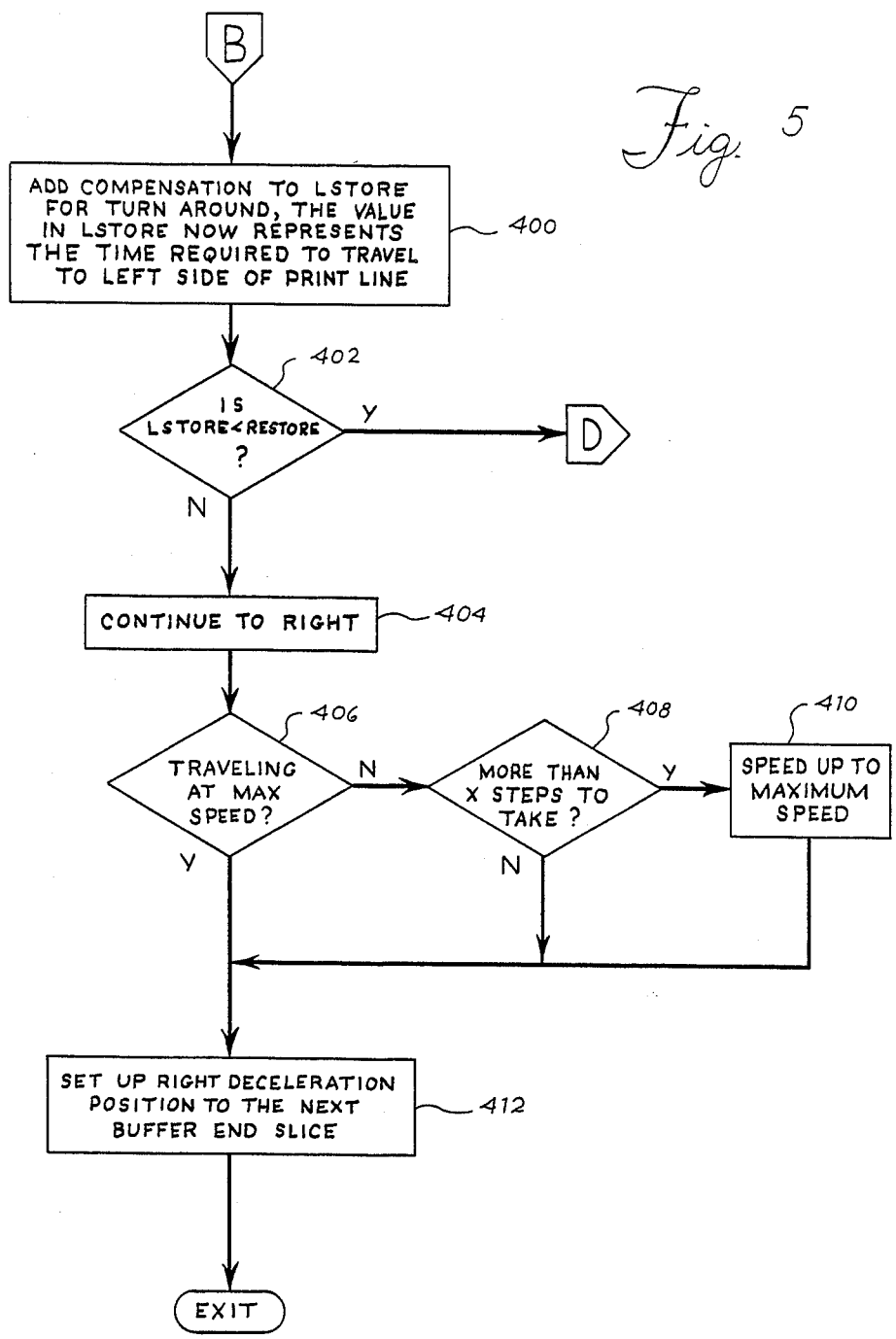

Referring now to FIG. 5, in block 400, a compensation factor is added to LSTORE to account for one deceleration time, one acceleration time and the settling time associated with print element 52 and carrier motor 54. This compensation factor will be a constant value for a particular printer and is determined by empirical measurements well known to those skilled in the art. The value in LSTORE is representative of the amount of time for print element 52 to be in position for printing the next line from left to right while the value in RSTORE is representative of the amount of time for print element 52 to be in position for printing from right to left, both values are expressed in time-steps. In decision block 402, LSTORE is compared with RSTORE. If LSTORE is less than RSTORE, meaning it is quicker to turn around and print from left to right, the program exits to point D, FIG. 8, to stop immediately.

If it is quicker to print from right to left, block 404 says continue right. In decision block 406, the program tests to determine whether print element 52 is moving at less than the maximum constant speed. If so, decision block 408 determines the remaining number of steps to reach the intended position and whether there are more than enough steps to accelerate. If there are enough steps, the print element is accelerated to maximum speed, block 410. In block 412, the actual stopping position for print element 52 is determined.

Figure 11:
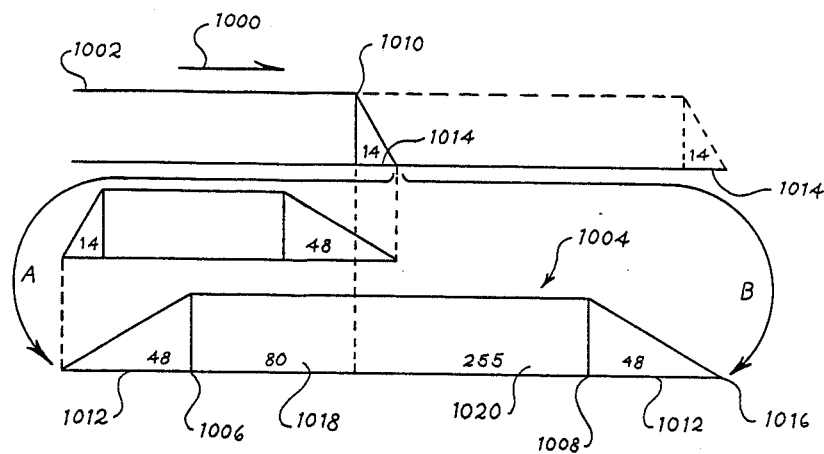
FIG. 11 shows alternative paths followed by a print element in a system using the invention and in a system using the techniques of the prior art.

Referring now to FIG. 11, arrow 1000 represents the current direction of print element 52 in printing character along current print line 1002. Next print line 1004 has begin slice 1006 and endslice 1008. Current endslice 1010 of current print line 1002 will be the reference point for measuring the time to reach begin slice 1006 along path A and the time to reach endslice along path B.

Also referring now to the flow chart of FIGS. 4 and 5, block 304 adds the next acceleration (NA), minus the current deceleration (CD) to the next endslice. In FIG. 11, the next acceleration 1012 consists of 48 time-steps; from this value is subtracted the current deceleration 1014 consisting of 14 time-steps to yield a value of 34 time-steps. The value of 34 time-steps is added to the value representing endslice 1008. From this total is subtracted the current endslice to yield the time for the print element to reach right end position 1016. In this example the next endslice minus the current endslice equals 255 time-steps, plus the 34 time-steps previously determined equals 289 time-steps to reach right end position 1016 continuing in the current direction; this corresponds to path B and is the value stored in RSTORE.

In blocks 310 and 312 of FIG. 4, and block 400 of FIG. 5, the time required to traverse path A, FIG. 11 is determined. In block 310, the next acceleration 1012 is added to the current deceleration 1014, yielding a value of 62 time-steps. This value is added to the leftward displacement 1018, leftward displacement 1018 equals 180 time-steps and is determined by subtracting next begin slice 1006 from current endslice 1010. The addition of leftward displacement 1018, next acceleration 1012 and current deceleration 1014 yields 242 time-steps. This is the value stored in LSTORE. Next, in block 400, FIG. 5, a compensation factor equal to 55 time-steps is added to the value in LSTORE making the new value in LSTORE equal to 297 time-steps. The compensation factor for this example is determined empirically, but is generally comprised of an acceleration time, a deceleration time and a settling time associated with a particular device. LSTORE is then compared with RSTORE. In this example, LSTORE equals 297 time-steps and RSTORE equals 282 time-steps. Inasmuch as RSTORE is less than LSTORE, it will be faster to continue in the current direction and print from right to left.

Under the bidirectional logic seeking methods of the prior art, the leftward displacement 1018 would be compared with the rightward displacement 1020, if leftward displacement 1018 is less than rightward displacement 1020, as is true in this example, printing would be along path A and not path B taking more time and thus resulting in slower through-put.

Figure 6:
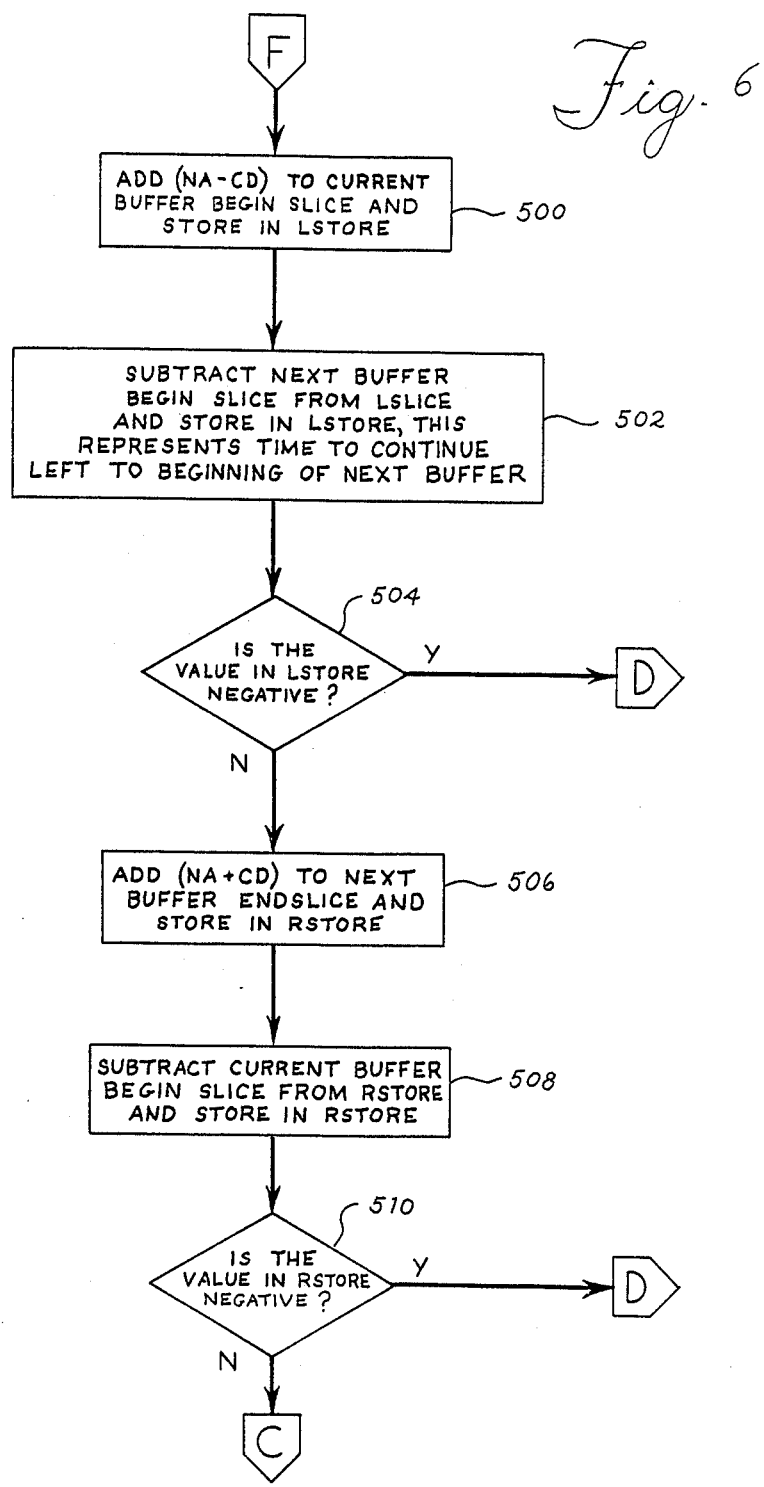

Referring now to FIG. 6, point F is the branch the program takes if the print element is moving left. In block 500, the value NA-CD, which is the number of time-steps to decelerate from the maximum current speed is subtracted from the number of time-steps to accelerate to constant speed for the next line; this value is added to the current end position and stored in LSTORE. The right end position of the next line is subtracted from the value in LSTORE and the new value is stored in LSTORE, block 502. The current value in LSTORE represents the time required for print element 52 to continue leftward and start printing the next line at the left end position.

Figure 8:
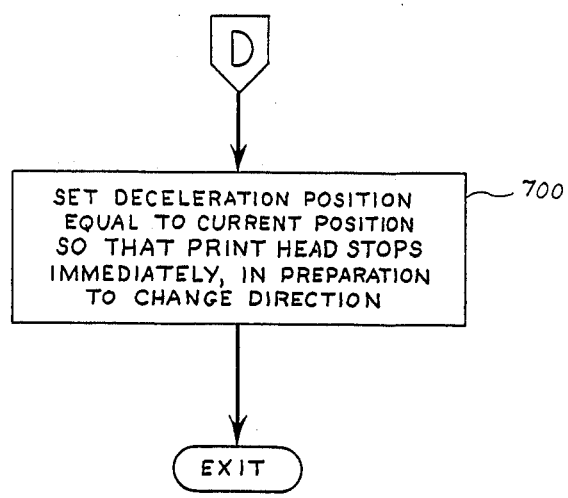

In decision block 504, it is determined whether the next print line is entirely to the right of the current print position; if so, the program exits to an immediate stop routine, point D, FIG. 8. If the next print line does not lie entirely to the right, the routine determines the time required to reach the right end position of the next print line, blocks 506 and 508. In block 506, the time required to accelerate to constant speed for the next line, NA, is added to the time to decelerate from the current constant speed, CD. This value, NA+CD, is added to the right end position of the next line and stored in RSTORE. In block 508, the current end position is subtracted from RSTORE and stored back in RSTORE. If the next line is entirely to the left of the current line than the value in RSTORE is negative and the program branches, decision block 510, to an immediate stop; otherwise, the program continues to the routine for determining which end position will result in the quickest path to begin printing.

Figure 7:
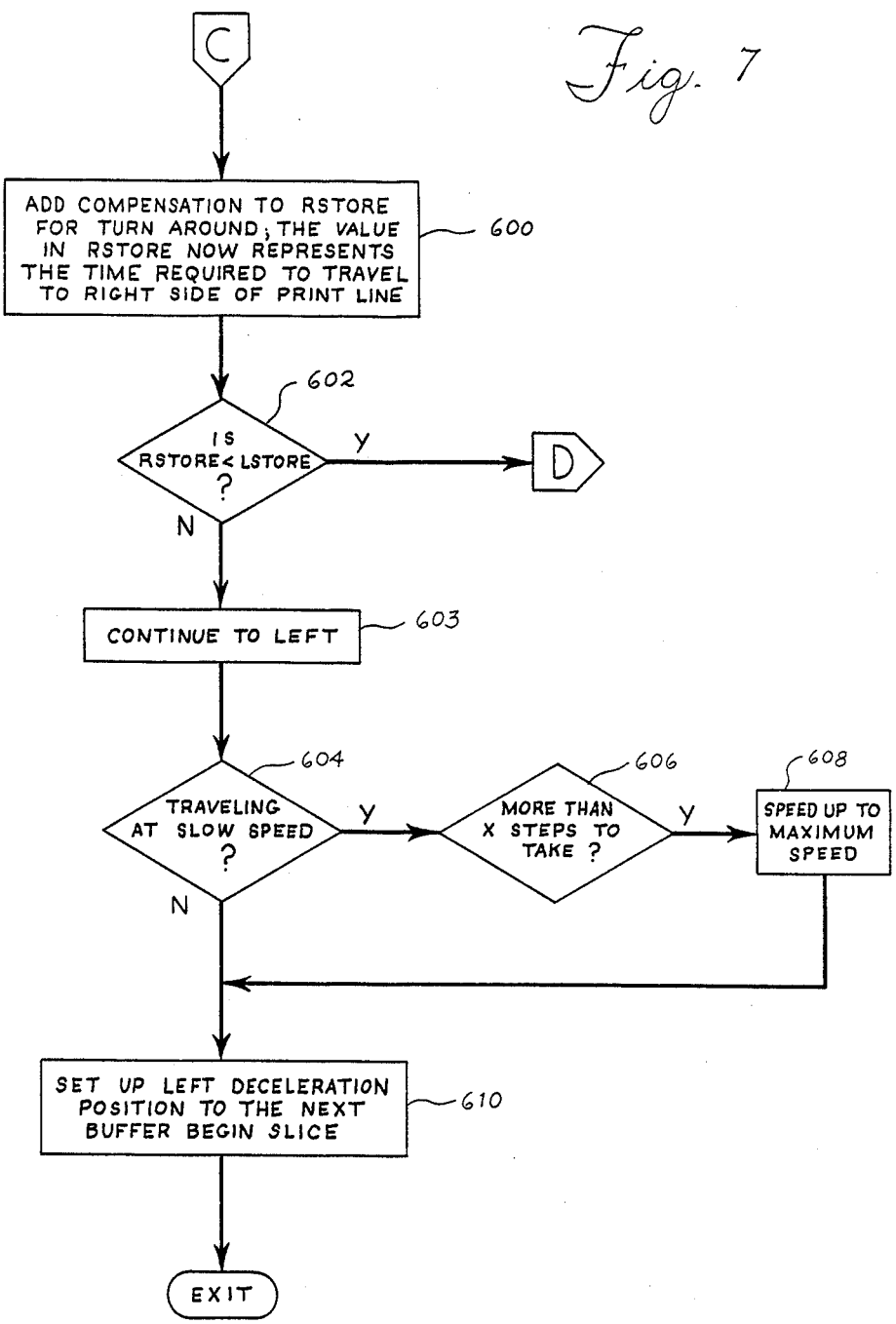

Referring now to FIG. 7, block 600, a compensation factor comprised of the time required for print element 52 to decelerate, accelerate and settle is added to the value in RSTORE. The compensation factor is determined empirically for the particular motors that are used. In decision block 602, the quickest path is determined. If RSTORE is less than LSTORE, print element 52 continues to the left, block 603; otherwise the program exits to D, FIG. 8, to stop immediately.

Current speed is tested, in decision block 604, to determine whether print element 52 is traveling at less than maximum speed. If print element 52 is travelling at the slower rate, decision block 606 determines whether there are enough steps left to accelerate to top speed. If there are enough steps left, the print element is speeded up, block 608. The last step before exiting the routine is to set up the actual stopping position, block 610.

Block 700, FIG. 8 represents an immediate stop which is performed for those conditions that require the print element to change direction. Block 800, FIG. 9, represents a routine for testing the current print element position relative to the sideframe of the printer. As is illustrated in FIG. 11, at least one deceleration and one acceleration is required to stop and start. The routine of block 800 insures that there is enough room between the sideframe and the next start position to allow for acceleration.

From the above description it will be seen by those having skill in the art that under the present invention, through-put of a bidirectional serial printer is maximized by minimizing the time required to traverse between print positions, notwithstanding the fact that a greater distance needs to be traversed. Since the invention may be incorporated into a microprocessor controlled printer, this increased through-put may be realized with little added cost. While the invention has been particularly shown and described with reference to a preferred embodiment, it will be understood by those skilled in the art that various other changes in form and detail may be made without departing from the spirit and scope of the invention.

We claim:

1. A printer comprising:
    a print element for producing characters on a plurality of print lines;
    means for moving said print element in a first direction to an end position in a first print line; and,
    means for moving said print element from said end position to a selected one of two ends in a next print line, said selected one of two ends determined by the minimum time for said print element to travel from said end position in said first print line to each of said two ends in said next print line even through said selected end of said next print line is a greater distance from said end position than the other end of said next line.

2. A printer comprising:
   means for moving a print element along a first print line in a direction;
   first means for summing an acceleration time, a negative deceleration time and a displacement in said first direction to determine a first time;
   second means for summing said acceleration time, said deceleration time, a compensation factor and a displacement in said second direction to determine a second time; and
   means for moving said print element along a next print line in said first direction if said first time is less than said second time and in said second direction if said second time is less than said first time.

3. In a printer capable of bidirectional printing using a moving print element, the improvement comprising:
   means for moving said print element along a print line in a first direction;
   first means for analyzing a next print line and for summing an acceleration time, a negative deceleration time and a displacement in said first direction to determine a first time required to reach a first end position of said next print line if the print element continues to travel in said first direction;
   second means for analyzing said next print line and for summing said acceleration time, said deceleration time, a compensation factor and a displacement in a second direction opposite said first direction to determine a second time required to reach a second end position of said next print line if the print element travels in said second direction; and,
   means responsive to said first and second analyzing means for selecting a print element direction requiring the least amount of time to reach either of said first or second end positions and for directing said means for moving said print element to follow said selected direction.

4. A method for controlling a serial printer comprising the steps of:
   printing a first character line with a printing element moving in one direction to an end position;
   determining a first end position and a second end position of a next print line;
   computing a first time for printing said next line along a first path beginning at said first end position by adding an acceleration time to a first displacement and subtracting a deceleration time;
   computing a second time for printing said next line along a second path beginning at said second end position by adding said acceleration time to a compensation factor and a second displacement and subtracting said deceleration time and;
   selecting either said first path or said second path corresponding to the shorter of said first time and said second time; and,
   printing said next line along said selected path.

5. The printer of claim 2 wherein said compensation factor comprises the sum of an acceleration time, a deceleration time and a settling time associated with means for moving.

6. The printer of claim 3 wherein said compensation factor comprises the sum of an acceleration time, a deceleration time and a settling time associated with said print element moving means.

7. The method of claim 4 wherein said step for determining said first end position and said second end position is performed while said printing element continues to move in said one direction.

8. The method of claim 4 wherein said compensation factor comprises an acceleration time, a deceleration time and a settling time.

9. The apparatus of claim 2 wherein said compensation factor comprises an acceleration time, a deceleration time and a settling time.

10. The apparatus of claim 3 wherein said compensation factor comprises an acceleration time, a deceleration time and a settling time.

11. A method for controlling a serial printer comprising the steps of:
    printing a line with a printing element move in one direction to an end position;
    determining a first end position and a second end position of a next line;
    selecting a first path for printing said next line beginning at said first end position if a distance to said first end position plus a compensation factor is less than a distance to said second end position; and
    selecting a second path for printing said next line beginning at said second end position if said distance to said first end position plus said compensation factor is greater than said distance to said second end position.

12. The method of claim 11 wherein said compensation factor accounts for a delay associated with changing direction of said printing element.

* * * * *